(12) United States Patent
Cannon

(10) Patent No.: US 7,681,421 B2
(45) Date of Patent: Mar. 23, 2010

(54) ELECTRICAL PANEL LOCKOUT

(76) Inventor: Richard Michael Cannon, 2777 Judith Dr., Bellmore, NY (US) 11710

( * ) Notice: Subject to any disclaimer, the term of this patent is extended or adjusted under 35 U.S.C. 154(b) by 0 days.

(21) Appl. No.: 12/153,094

(22) Filed: May 14, 2008

(65) Prior Publication Data
US 2008/0302146 A1 Dec. 11, 2008

Related U.S. Application Data

(60) Provisional application No. 60/934,030, filed on Jun. 11, 2007.

(51) Int. Cl.
*E05C 19/18* (2006.01)

(52) U.S. Cl. .................. 70/14; 70/94; 70/164; 70/232; 70/461; 70/DIG. 57; 70/DIG. 64; 200/43.14; 200/43.19; 200/43.22; 292/259 R; 292/262; 292/263; 292/288; 292/289

(58) Field of Classification Search ............ 70/DIG. 64, 70/DIG. 65, DIG. 66, 14, 229–232, 164, 70/DIG. 57, 461, 177, 180, 19, 202, 203, 70/211, 212, 93, 94; 292/259 R, 148, 288, 292/262, 263, 265–278, DIG. 11, DIG. 44, 292/DIG. 60, 258, 338, 339, 289, 291, 292–295, 292/256, 260; 200/43.01, 43.11, 43.14, 43.15, 200/43.16, 43.19, 43.22
See application file for complete search history.

(56) References Cited

U.S. PATENT DOCUMENTS

| | | | | | |
|---|---|---|---|---|---|
| 2,479,300 | A | * | 8/1949 | Binz | 70/232 |
| 2,596,802 | A | * | 5/1952 | Will | 70/230 |
| 2,912,847 | A | * | 11/1959 | Putman et al. | 70/232 |
| 3,280,606 | A | * | 10/1966 | Howard et al. | 292/259 R |
| 3,287,943 | A | * | 11/1966 | Vaughn et al. | 70/58 |
| 3,729,963 | A | * | 5/1973 | Hintz | 70/230 |
| 3,808,851 | A | * | 5/1974 | Kargus et al. | 70/232 |
| 4,262,503 | A | * | 4/1981 | Kuebler | 70/101 |
| 4,667,992 | A | * | 5/1987 | Roden, Jr. | 292/259 R |
| 4,792,168 | A | * | 12/1988 | Kardosh | 292/288 |
| 4,838,243 | A | * | 6/1989 | Kuber | 126/280 |
| 4,852,921 | A | * | 8/1989 | Gilbert et al. | 292/259 R |
| 5,022,697 | A | * | 6/1991 | Hettwer | 296/37.6 |
| 5,102,173 | A | * | 4/1992 | Schallern | 292/288 |
| 5,103,659 | A | * | 4/1992 | Benefield, Sr. | 70/94 |
| 5,165,741 | A | * | 11/1992 | Everett | 292/259 R |
| 5,259,821 | A | * | 11/1993 | Bryant | 474/136 |
| 5,340,172 | A | * | 8/1994 | Sweet | 292/259 R |

(Continued)

*Primary Examiner*—Lloyd A Gall
(74) *Attorney, Agent, or Firm*—Hoffmann & Baron, LLP

(57) ABSTRACT

An electrical panel lockout that locks the electrical panel door closed and prevents the panel cover from being removed. Two telescoping hollow tubes extend between two panel screws. Two slots in the ends of the hollow tubes slide under the screw heads of each of the loosened panel screws. The outer hollow tube and inner hollow tube extend across the panel door keeping it locked closed. The shackle of a padlock is inserted into one of the openings of the inner hollow tube to keep the device locked in the extended position onto the panel screws. The screw heads are encapsulated by the device rendering them inaccessible and preventing the electrical panel cover from being removed. Hollow tube extension fittings can be employed to increase the length of the device for use on electrical panels of larger widths. A guide screw attached to the inner hollow tube rides in a slot in the outer hollow tube to keep both tubes from separating.

18 Claims, 1 Drawing Sheet

U.S. PATENT DOCUMENTS

| | | | |
|---|---|---|---|
| 5,419,165 A * | 5/1995 | Perkins | 70/14 |
| 5,452,929 A * | 9/1995 | Anderson | 292/288 |
| 5,466,023 A * | 11/1995 | Williamson | 292/259 R |
| 5,669,641 A * | 9/1997 | Jeansonne | 292/259 R |
| 5,765,416 A * | 6/1998 | Cote | 70/238 |
| 5,772,266 A * | 6/1998 | Skiba | 292/259 R |
| 5,799,521 A * | 9/1998 | Kennedy | 70/416 |
| 6,705,652 B2 * | 3/2004 | Engel | 292/259 R |
| 6,718,804 B1 * | 4/2004 | Graves et al. | 70/177 |
| 6,829,914 B2 * | 12/2004 | Bullock | 70/14 |
| 6,990,838 B2 * | 1/2006 | Witchey | 70/14 |
| 7,178,840 B1 * | 2/2007 | Veach | 292/256.5 |

* cited by examiner

ELECTRICAL PANEL LOCKOUT

RELATED APPLICATIONS

The present application claims benefit of U.S. provisional application Ser. No. 60/934,030, filed Jun. 11, 2007, for ELECTRICAL PANEL LOCKOUT, which is incorporated herein by reference in its entirety.

FIELD OF THE INVENTION

The present invention relates to electrical panels and, more particularly, to the electrical panel door and the electrical panel cover.

BACKGROUND OF THE INVENTION

In order to protect themselves from electric shock when working on electrical wiring, electricians need to turn off the electrical power and to be sure that no one else can turn the power back on. Fuses must be removed or circuit breakers must be shut off before electrical work can proceed. If someone replaces the fuse or turns the circuit breaker on while the electrical work is being done, the electrician can be injured or killed by electric shock.

In addition, users of critical equipment are fearful that accidental shutdowns may have severe consequences. Some examples would be the accidental shutdown of: hospital equipment serving an operating room or life support system; airport equipment for air traffic control or communication equipment used by emergency personnel.

The present invention is a solution to both of these problems. Electricians can turn off the circuit breakers they need to work on, lock the electrical panel door with the electrical panel lockout using their own lock. They can be confident that no one will turn those circuit breakers back on while work is being performed. Users of critical equipment can prevent accidental shutdowns by keeping unauthorized persons from entering the electrical panels controlling said equipment by installing the electrical panel lockout with their own lock.

Prior art patents which seek to provide solutions to these problems can be seen in the U.S. Pat. No. 3,044,815, to Soss, for a latching mechanism wherein a panel door can be locked with a key. In the U.S. Pat. No. 5,147,991, to Jordan, Sr., an electrical switch locking system locks a circuit breaker with a padlock. In the U.S. Pat. No. 5,419,165, to Perkins, an electrical panel locking apparatus has a pair of sliding iron bars that clip around the outside of the panel door and are locked in place with a padlock.

To limit the number of persons having access to circuit breakers or fuses, many electrical panel doors are equipped with a latching mechanism that can be locked with a key. One problem with these locks is that many people have the keys for them. The keys for most panel doors from particular electrical panel manufacturers are keyed alike so that electricians, maintenance people and others can have access to a locked panel. Another problem is that access to the circuit breakers can be gained even without a key by simply removing the screws that attach the panel cover to the panel backbox and removing the panel cover and door.

Electrical switch locking systems, also known as circuit breaker lockouts, can be used to lockout a circuit breaker in the off position. They are commonly used by electricians but they have many shortcomings. First, although these devices are claimed to be universal, they are not. There are many different types and sizes of circuit breakers due to amperage ratings, voltage ratings, the number of poles and different manufacturer's models. An electrician must have every different type of circuit breaker lockout available to be able to lockout each particular circuit breaker. Second, each circuit breaker lockout requires its own lock. Many locks will be needed when a number of breakers need to be shut off. This can be quite cumbersome. Third, when the circuit breaker lockout and lock is installed, the panel door cannot be closed. Other circuit breakers in the panel are left accessible to others. It is not desirable to have circuit breakers controlling critical equipment left accessible because of an open panel door. Fourth, while installing circuit breaker lockouts and locks there is the possibility of accidentally shutting off an adjacent circuit breaker causing an equipment shut down. Fifth, many circuit breaker lockouts are flimsy. They fall off or can be easily removed. Sixth, circuit breaker lockouts cannot be used to lock a circuit breaker in the on position. If a circuit breaker was locked in the on position, it could not trip and would not provide the over-current protection that is needed.

The electrical panel locking apparatus is designed to lock an electrical panel door closed but it has some shortcomings. First, being made of iron makes the apparatus heavy and unlikely to be carried by an electrician with his or her standard tools. Also, iron is a conductor of electricity. Many situations require that a panel that needs to be locked is in an electrical closet with other panels and switches. This other equipment may be open with live electricity present. It can be dangerous to employ an iron device in the vicinity of live electrical equipment. Second, during installation this device needs to extend beyond the panel being locked. Thus it can not be used on a panel that is located in a corner next to a wall, or, on a panel located next to another electrical panel or other equipment. These conditions occur often in crowded electrical closets. Third, access to the circuit breakers or fuses can be obtained by removing the panel cover screws and the panel cover thereby defeating the apparatus' intent.

In contrast to these prior art devices, the present invention provides a lightweight and universal method to lockout both circuit breakers and fuses. The key used to lock the device is the user's own key. The device locks the electrical panel door closed and locks the panel cover onto the panel backbox. The device is tamperproof so that it can not be removed without the key. The device can be used on most electrical panels regardless of the electrical panel's proximity to adjacent panels or walls. The device is simple and economical to produce.

It is therefore an object of the invention to lock an electrical panel door with the users own lock. The circuit breakers can then be locked in the desired on or off positions. Fuses can be locked in the installed state or the removed state.

It is another object of the invention to be tamperproof. The device encapsulates two of the electrical panel screws rendering them inaccessible so that the panel cover cannot be removed.

It is another object of the invention to provide an electrical panel lockout device that is portable. The device is lightweight and small enough to fit in an electrician's tool bag when retracted.

It is another object of the invention to be a universal lockout device. The electrical panel is designed to fit various sized panels. Hollow tube extension fittings extend the length of the electrical panel lockout to fit larger panels while maintaining portability.

It is another object of the invention to be usable on most electrical panels regardless of the panel's proximity to walls or other equipment. The device does not extend beyond the width of the electrical panel being locked, either during the installation or after it is installed.

It is another object of the invention that it can be made of a material that is safe to use in all applications. When used in close vicinity to live open electrical equipment, the device can be constructed of PVC, polyvinyl chloride hollow tube, which does not conduct electricity. Where live open electrical equipment is not present, the device can be made from metal hollow tube.

It is another object of the invention is to be affordably priced. The simple design of the device makes it inexpensive to produce.

SUMMARY OF THE INVENTION

In accordance with the present invention, there is a provided an electrical panel lockout that locks the electrical panel door and prevents the panel cover from being removed. An inner hollow tube slides inside a larger outer hollow tube so that both hollow tubes telescope. Each hollow tube has a slot in the end. The hollow tubes extend between two panel screws. The slots in the ends of the hollow tubes slide under each of the loosened panel screws attaching the device to the panel cover. The hollow tubes extend across the panel door. The locking mechanism keeps the hollows tubes in the extended position locking the panel door closed. The inner hollow tube has a plurality of openings therein for alignment in different positions for the locking mechanism so as to fit different sized electrical panels. The screw heads are encapsulated by the device rendering them inaccessible and preventing the electrical panel cover from being removed. A guide screw attached to the inner hollow tube rides in a slot in the outer hollow tube to keep both tubes from separating. Hollow tube extension fittings can be employed for use on larger electrical panels.

BRIEF DESCRIPTION OF THE DRAWINGS

A complete understanding of the present invention may be obtained by reference to the accompanying drawings, when considered in conjunction with the subsequent, detailed description in which.

For purposes of clarity and brevity, like elements and components will bear the same designations and numbering throughout the Figures.

DETAILED DESCRIPTION OF THE PREFERRED EMBODIMENT

Figure 1:
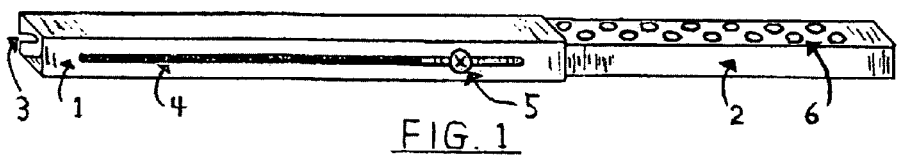
FIG. 1 is a perspective view of an electrical panel lockout partially extended.

Referring to FIGS. 1-5 of the drawings, an electrical service panel includes an electrical panel backbox 12, a panel cover 10 removably securable to the panel backbox 12 with peripheral panel screws 7 and a panel door 11 hinged to the panel cover 10 via hinges 15, to allow access to circuit breakers or fuses in the electrical panel backbox 12 of the electrical service panel.

Figure 2:
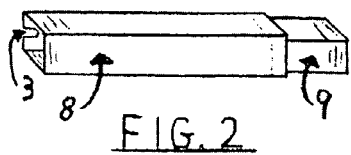
FIG. 2 is a perspective view of of an extension member that includes a hollow extension tube and coupling.
Figure 3:
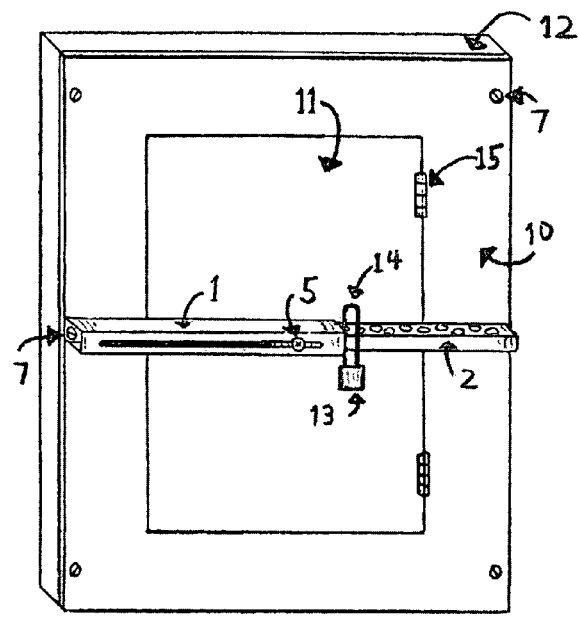
FIG. 3 is a perspective view of an electrical service panel that includes a panel backbox, panel cover and panel door, having an electrical service panel lockout device attached in accordance with the present invention.
Figure 4:
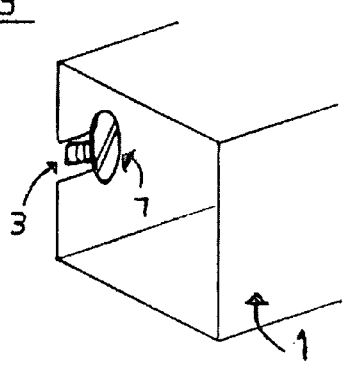
FIG. 4 is an exploded side elevation showing the outer hollow tube installed over the panel screw.
Figure 5:
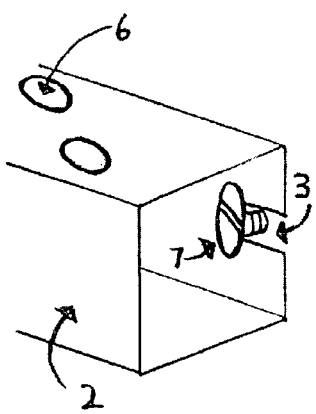
FIG. 5 is an exploded side elevation showing the inner hollow tube installed over the panel screw.

An electrical service panel lockout device to block access to the interior of the electrical service panel is also shown in FIGS. 1-5. The device attaches to the panel screws 7 of the panel cover 10 and spans across the panel cover 10 and the panel door 11. The device is locked in place with a padlock 13 that has a shackle 14 which fits through the appropriate hole 6 in the inner hollow tube 2 keeping the device in the extended position attached to the panel screws 7. The device includes an outer hollow tube 1 with a slot 3 to slide under a first panel screw 7 and a inner hollow tube 2 that is smaller than the outer hollow tube 1 so that the two tubes can telescope to extend across the panel cover 10 and the panel door 11 so that the slot 3 in the inner hollow tube 2 can slide under a second panel screw 7. As particularly shown in FIGS. 3-5, slots 3 allowed the head of the panel screws 7 to be received to the interior of the outer hollow tube 1 and to the interior of the inner hollow tube 2 in the extended position. The outer hollow tube 1 and the inner hollow tube 2 extend to about the periphery of the panel cover 10 as shown in FIG. 3. Specifically, the slots 3 are configured to have lengths shown in FIGS. 4 and 5 such that the outer hollow tube 1 and the inner hollow tube 2 do not extend beyond the width of the panel cover 10. This is accomplished by providing slots 3 that have lengths which are approximately the same as distances from the periphery of the panel cover 10 to the panel screws 7.

The inner hollow tube 2 has a plurality of openings 6 evenly spaced on the top and bottom that are aligned so that the shackle 14 of a padlock 13 can fit through them keeping the outer hollow tube 1 and the inner hollow tube 2 extended onto the panel screws 7 and attached to the panel cover 10 across the panel door 11. As particularly shown in FIGS. 1, 3 and 6, the openings 6 on the top can be staggered with respect to the openings 6 on the bottom, or vice versa, to provide incremental changes to the extended position of the inner hollow tube 2 with respect to the outer hollow tube 1 so that the outer hollow tube 1 and the inner hollow tube 2 can be securely or fully extended onto panel screws 7. The outer hollow tube 1 and the inner hollow tube 2 encapsulate the panel screws 7 making them inaccessible so that they cannot be removed.

The outer hollow tube 1 has a long guide slot 4 in the front in which the guide screw 5 rides. The guide screw 5 attaches to a hole in the inner hollow tube 2 through the guide slot 4 of the outer hollow tube 1. The guide screw 5 and slot 4 serve to keep the outer hollow tube 1 and the inner hollow tube 2 from separating. FIG. 2 shows an extension member to extend the device that is shown in FIG. 1. The extension member includes a hollow extension tube 8 of approximately the same cross section as the outer tube 1 and an internal coupling 9 that fits into the outer hollow tube 1 to secure the hollow extension tube 8 to the outer hollow tube 1. The hollow extension tube 8 has a slot 3. When the hollow extension tube 8 is used, the slot 3 of the hollow extension tube 8 slides under the first panel screw 7 to secure the hollow extension tube 8 and the outer hollow tube 1 onto the first panel screw 7 and attach the same to the panel cover 10.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. An electrical service panel lockout device to block access to the interior of an electrical service panel that includes a backbox, a panel cover removably securable to the backbox at least by a first peripheral screw and a second peripheral screw, and a door hinged to the panel cover between the first peripheral screw and the second peripheral screw, the device comprising:

an outer tube including a first slot extending from a first end of the outer tube toward a second end of the outer tube and configured to receive the head of the first peripheral screw via the first slot to the interior of the outer tube;

an inner tube including a second slot extending from a first end of the inner tube toward a second end of the inner tube and configured to telescope with respect to the outer tube across the panel cover and the door from a first position to a second extended position to receive the head of the second peripheral screw via the second slot to the interior of the inner tube;

a locking means for locking the inner tube in the second extended position with respect to the outer tube to block removal of the panel cover from the backbox and to block opening of the door with respect to the panel cover; and an extension member comprising:

an extension tube including a third slot extending from a first end of the extension tube toward a second end of the extension tube and configured to extend the outer tube to receive the head of the first peripheral screw via the third slot to the interior of the extension tube; and a coupling extending from the second end of the extension tube and configured to be inserted inside the first end of outer tube to secure the extension tube to the outer tube.

2. The device of claim 1, wherein the outer tube and the inner tube have square cross sections.

3. The device of claim 1, wherein the inner tube comprises a plurality of openings through the inner tube that are configured to align the inner tube with respect to the outer tube in a plurality of extended positions.

4. The device of claim 3, wherein the locking means is a padlock having a shackle configured to extend through one opening of the plurality of openings to lock the inner tube in the second extended position of the plurality of extended positions with respect to the outer tube.

5. The device of claim 3, wherein the plurality of openings comprises:

a first set of openings extending between the first end and the second end of the inner tube; and a second set of openings extending between the first end and the second end of the inner tube, the second set of openings being disposed above or below the first set openings and staggered with respect to the first set of openings.

6. The device of claim 1, further comprising a guide screw secured at about the second end of the inner tube through a guide slot in the outer tube that extends between the first end and the second end of the outer tube to allow the inner tube to telescope and to prevent separation of the inner tube from the outer tube.

7. The device of claim 1, wherein the extension tube and the coupling of the extension member have square cross sections.

8. The device of claim 1, wherein the outer tube, the inner tube and the extension member are made of polyvinyl chloride (PVC) or metal.

9. An electrical service panel system, the system comprising:

an electrical service panel including a backbox and a panel cover removably securable to the backbox at least by a first peripheral screw and a second peripheral screw, and a door hinged to the panel cover between the first peripheral screw and the second peripheral screw; and an electrical service panel lockout device to block access to the interior of the electrical service panel, the device comprising:

an outer tube including a first slot extending from a first end of the outer tube toward a second end of the outer tube and configured to receive the head of the first peripheral screw via the first slot to the interior of the outer tube;

an inner tube including a second slot extending from a first end of the inner tube toward a second end of the inner tube and configured to telescope with respect to the outer tube across the panel cover and the door from a first position to a second extended position to receive the head of the second peripheral screw via the second slot to the interior of the inner tube;

a locking means for locking the inner tube in the second extended position with respect to the outer tube to block removal of the panel cover from the backbox and to block opening of the door with respect to the panel cover; and an extension member comprising:

an extension tube including a third slot extending from a first end of the extension tube toward a second end of the extension tube and configured to extend the outer tube to receive the head of the first peripheral screw via the third slot to the interior of the extension tube; and a coupling extending from the second end of the extension tube and configured to be inserted inside the first end of outer tube to secure the extension tube to the outer tube.

10. The electrical service panel system of claim 9, wherein the first end of the outer tube and the first end of the inner tube extend to about the periphery of the panel cover in the second extended position.

11. The electrical service panel system of claim 9, wherein the inner tube comprises a plurality of openings through the inner tube that are configured to align the inner tube with respect to the outer tube in a plurality of extended positions.

12. The electrical service panel system of claim 11, wherein the locking means is a padlock having a shackle configured to extend through one opening of the plurality of openings to lock the inner tube in the second extended position of the plurality of extended positions with respect to the outer tube.

13. The electrical service panel system of claim 11, wherein the plurality of openings comprises:

a first set of openings extending between the first end and the second end of the inner tube; and a second set of openings extending between the first end and the second end of the inner tube, the second set of openings being disposed above or below the first set openings and staggered with respect to the first set of openings.

14. The electrical service panel system of claim 9, wherein the electrical service panel lockout device further comprises a guide screw secured at about the second end of the inner tube through a guide slot in the outer tube that extends between the first end and the second end of the outer tube to allow the inner tube to telescope and to prevent separation of the inner tube from the outer tube.

15. The electrical service panel system of claim 9, wherein the first end of the extension tube and the first end of the inner tube extend to about the periphery of the panel cover in the second extended position.

16. The electrical service panel system of claim 9, wherein the outer tube, the inner tube and the extension member are made of polyvinyl chloride (PVC) or metal.

17. A method of blocking access to the interior of an electrical service panel that includes a backbox, a panel cover removably securable to the backbox at least by a first peripheral screw and a second peripheral screw, and a door hinged to the panel cover between the first peripheral screw and the second peripheral screw, the method comprising:

providing an outer tube configured to receive the head of the first peripheral screw to the interior of via a first slot in the outer tube that extends from a first end of the outer tube toward a second end of the outer tube;

securing an extension tube to the outer tube via coupling that extends from a second end of the extension tube and inserts into the first end of the outer tube;

receiving the head of the first peripheral screw to the interior of the extension tube via a second slot in the extension tube that extends from a first end of the extension tube toward the second end of the extension tube;

telescoping an inner tube with respect to the outer tube from a first position across the panel cover and the door to a second extended position to receive the head of the second peripheral screw to the interior of the inner tube via a third slot in the inner tube that extends from a first end of the inner tube toward a second end of the inner tube; and locking the inner tube in the second extended position with respect to the outer tube to block removal of the panel cover from the backbox and to block opening of the door with respect to the panel cover.

18. The method of claim 17, further comprising:

loosening the first peripheral screw sufficiently to allow the head of the first peripheral screw to be received to the interior of the extension tube via the second slot of the extension tube; and loosening the second peripheral screw sufficiently to allow the head of the second peripheral screw to be received to the interior of the telescoping inner tube via the third slot of the telescoping inner tube.

* * * * *